United States Patent
Benner et al.

(10) Patent No.: US 11,156,493 B2
(45) Date of Patent: Oct. 26, 2021

(54) FILLING LEVEL INDICATOR

(71) Applicant: CONTINENTAL AUTOMOTIVE GmbH, Hannover (DE)

(72) Inventors: Hans-Guenter Benner, Kriftel (DE); Matthias Kadler, Ruesselsheim (DE)

(73) Assignee: Vitesco Technologies GmbH, Hannover (DE)

( * ) Notice: Subject to any disclaimer, the term of this patent is extended or adjusted under 35 U.S.C. 154(b) by 54 days.

(21) Appl. No.: 16/318,759

(22) PCT Filed: Jul. 10, 2017

(86) PCT No.: PCT/EP2017/067269
§ 371 (c)(1),
(2) Date: Jan. 18, 2019

(87) PCT Pub. No.: WO2018/015195
PCT Pub. Date: Jan. 25, 2018

(65) Prior Publication Data
US 2019/0293474 A1  Sep. 26, 2019

(30) Foreign Application Priority Data
Jul. 22, 2016 (DE) .......................... 102016213501.5

(51) Int. Cl.
*G01F 23/36* (2006.01)
*G01D 5/165* (2006.01)
*G01F 23/38* (2006.01)

(52) U.S. Cl.
CPC ........... *G01F 23/363* (2013.01); *G01D 5/165* (2013.01); *G01F 23/38* (2013.01)

(58) Field of Classification Search
CPC ........... B60K 2015/03217; G01F 23/36; G01F 23/38; G01F 23/32; G01F 25/0061; G01F 23/30
See application file for complete search history.

(56) References Cited

U.S. PATENT DOCUMENTS 3,339,519 A * 9/1967 Taylor ...................... G01F 23/34
116/229
3,969,721 A * 7/1976 Chadwick ............ H01H 13/023
340/815.45

(Continued)

FOREIGN PATENT DOCUMENTS

CN  1236475  11/1999
CN  2048107550 U  11/2015

(Continued)

OTHER PUBLICATIONS

"A guide to plastics assembly", PHASA, available on the internet at <https://www.agaria.se/wp-content/uploads/2014/09/PHASA-Stake-Design-Guide.pdf>, uploaded on Sep. 2014. (Year: 2014).*

(Continued)

*Primary Examiner* — David A. Rogers
(74) *Attorney, Agent, or Firm* — Cozen O'Connor

(57) ABSTRACT

A filling level indicator for determining a filling level in a tank, having a resistor network, a contact element, and a magnetic element. The contact element is arranged spaced apart from the resistor network, and the magnetic element can be moved relative to the resistor network and the contact element. An electrically conductive connection can be established between the contact element and the resistor network by deflecting the contact element. A plastic spacer element is arranged between the resistor network and the contact element and is hot-swaged to the resistor network and/or to the contact element.

9 Claims, 2 Drawing Sheets

(56) References Cited

U.S. PATENT DOCUMENTS

| | | | | |
|---|---|---|---|---|
| 4,852,254 | A | * | 8/1989 | Duncan .................. B26B 21/06 30/50 |
| 5,744,769 | A | * | 4/1998 | Proctor ................ B60Q 1/1469 200/4 |
| 5,798,640 | A | * | 8/1998 | Gier ........................ G01D 5/18 324/207.22 |
| 5,963,124 | A | * | 10/1999 | Buss ...................... H01C 10/34 338/118 |
| 6,401,533 | B1 | * | 6/2002 | Gier ..................... B60K 15/077 73/313 |
| 6,442,045 | B1 | * | 8/2002 | Goodwin ............. H05K 7/1084 174/382 |
| 6,840,755 | B1 | * | 1/2005 | Cook ................... B29C 65/606 425/508 |
| 7,513,153 | B2 | * | 4/2009 | Benner ................. G01F 23/363 73/290 R |
| 8,480,057 | B2 | * | 7/2013 | Takahashi ........... F16K 99/0015 251/363 |
| 8,646,329 | B2 | * | 2/2014 | Mattmann ............... G01F 23/38 73/290 R |
| 2006/0288778 | A1 | * | 12/2006 | Benner ................. G01F 23/363 73/313 |
| 2007/0006647 | A1 | * | 1/2007 | Benner ................. G01F 23/363 73/305 |
| 2014/0118196 | A1 | * | 5/2014 | Koskiniemi ......... H01Q 19/106 343/702 |
| 2016/0123788 | A1 | * | 5/2016 | Farmanyan ............. G01F 23/38 73/317 |
| 2016/0250804 | A1 | * | 9/2016 | Wang ................. B29C 66/8322 403/267 |
| 2016/0268693 | A1 | * | 9/2016 | Ding ...................... G01S 13/931 |
| 2017/0049973 | A1 | * | 2/2017 | Tieck ..................... A61J 1/1481 |

FOREIGN PATENT DOCUMENTS

| | | |
|---|---|---|
| DE | 195 26 254 | 1/1997 |
| DE | 197 01 246 | 7/1998 |
| DE | 10 2004 039 853 | 3/2006 |
| DE | 10 2007 061 316 | 6/2009 |
| DE | 10201410728 | 12/2015 |
| WO | WO 2009/106381 | 9/2009 |
| WO | WO 2015/185265 | 12/2015 |

OTHER PUBLICATIONS

Clive Maier, "Design Guides for Plastics", Econology Ltd, Apr. 2009. (Year: 2009).*

Machine Translation of DE 102014210728 Which Originally Published On Dec. 17, 2015. (Year: 2015).*

Wikipedia: "Heißverstemmen", Jul. 24, 2016 (Jul. 24, 2016), XP055747632, Gefunden im Internet: URL:https://de.wikipedia.org/w/index.php?title=Heißverstemmen&oldid=156141773 [gefunden am Nov. 6, 2020].

Office Action dated Nov. 12, 2020 issued in European Patent Application No. 17737278.6.

* cited by examiner

FILLING LEVEL INDICATOR

CROSS REFERENCE TO RELATED APPLICATIONS

This is a U.S. national stage of application No. PCT/EP2017/067269, filed on Jul. 10, 2017. Priority is claimed on German Application No. DE102016213501.5, filed Jul. 22, 2016, the content of which is incorporated here by reference.

BACKGROUND OF THE INVENTION

1. Field of the Invention

The invention relates to a filling level indicator for determining a filling level in a tank, having a resistor network, a contact element, and a magnetic element, wherein the contact element is arranged spaced apart from the resistor network, and the magnetic element can be moved relative to the resistor network and the contact element, wherein an electrically conductive connection can be established between the contact element and the resistor network by deflecting the contact element.

2. Description of the Prior Art

Filling level indicators for determining the filling level in a fuel tank have a resistor network that generates a signal as a function of the actual filling level, which signal represents the filling level in the fuel tank. For this purpose, a float is used that floats on the surface of the fuel in the fuel tank and acts on the resistor network by a linkage and a sliding contact. The movement of the float owing to a rising or falling filling level is transmitted via the linkage to the sliding contact, which is moved past the resistor network as a result of the movement. In this context, a different electrical signal is generated as a function of the position of the sliding contact. By standardizing the signal and by configuring the resistor network in a specific way it is possible to infer the filling level in the fuel tank directly from the signal generated at the resistor network. Such filling level indicators are known in a wide variety of forms in the prior art.

Moreover, filling level indicators are known which have, instead of a sliding contact, a contact element that has a multiplicity of finger-like sections that can be deflected by a magnetic force such that electrical contact is generated between a finger-like section and a resistor network. An electrical signal is generated as a result of the generation of the electrical contact. By the generated signal it is possible to infer the filling level in the fuel tank directly as a function of the configuration of the resistor network and of the contact element. Such a filling level indicator is known, for example, from DE 197 01 246 A1.

The contact element is arranged spaced apart from the resistor network, with the result that a deflection of the finger-like sections can bring about contact between the contact element and the resistor network. The devices that have been known hitherto have spacer elements which do not have durable resistance, in particular with respect to the aggressive properties of the fuel.

SUMMARY OF THE INVENTION

An object of one aspect of the present invention is to provide a filling level indicator which has, between the contact element and the resistor network, a spacer element which is not sensitive to the chemical properties of the fuel.

An exemplary embodiment of the invention relates to a filling level indicator for determining a filling level in a tank, having a resistor network, a contact element, and a magnetic element, wherein the contact element is arranged spaced apart from the resistor network, and the magnetic element can be moved relative to the resistor network and the contact element, wherein an electrically conductive connection can be established between the contact element and the resistor network by deflecting the contact element, wherein a spacer element made of plastic is arranged between the resistor network and the contact element, wherein the spacer element is hot-swaged to the resistor network and/or to the contact element.

The plastic is particularly preferably resistant to the corrosive properties of the fuel within the fuel tank in which the filling level indicator is arranged. This is advantageous since it is therefore no longer necessary to provide a complete seal of the housing of the filling level indicator with respect to the fuel. In previous applications known from the prior art, the housing is embodied in a fluid-tight fashion and is usually filled with a protective gas such as, for example, helium, in order to ensure that fuel does not penetrate into the housing of the filling level indicator. The manufacture of such a housing is very complicated and therefore expensive. Furthermore, such housings have an additional fault source that can give rise to functional limitations or to the total failure of the filling level indicator.

Spacing apart the contact element from the resistor network is necessary to prevent permanent electrical conductive contact between the two elements. The contact element is preferably formed by a very thin metal foil with individual filigree, finger-like structures that can be deflected by a magnet passing by. The generation of a sufficiently large distance between the contact element and the resistor network therefore cannot be achieved by the contact element itself. It is therefore advantageous to space the contact element apart from the resistor network by an additional spacer element.

In order to generate a connection of the spacer element to the resistor network and/or the contact element, hot-swaging is preferably selected as a method, since a permanent stable connection can be generated without having to apply large forces to the resistor network and/or the contact element in the process. hot-swaging can generate a permanent and dimensionally stable connection.

It is particularly advantageous if the contact element and/or the resistor network have/has at least one penetration through which a projection of the spacer element protrudes.

This is advantageous for guiding the spacer element at least with a partial section through the resistor network and/or the contact element and for generating a permanent connection by the hot-swaging. Such guiding through of the material of the spacer element is necessary in order ultimately to bring about securement of the spacer element with the hot-swaging.

It is also advantageous if a partial section of the spacer element, which covers the respective penetration, is arranged on the contact element and/or on the resistor network, on the side respectively facing away from the spacer element.

As a result of the hot-swaging, a material section or projection of the spacer element, which is guided through one of the projections, is heated and deformed under pressure. In this context, the material section guided through the penetration is widened in a mushroom-like fashion, with the result that the latter is ultimately wider than the penetration through which it has been guided. This ensures that the spacer element can no longer be removed from the resistor network and/or the contact element without being destroyed.

It is preferably also possible to use molded parts that permit predefined deformation of the material of the spacer element, in order, for example, to generate a predefined height and/or width of the deformed region.

A preferred exemplary embodiment is characterized in that electrical insulation is provided between the contact element and the resistor network by the spacer element. The electrical insulation is necessary to permit the satisfactory functioning of the filling level indicator. In this context, only one defined partial section of the contact element is ever deflected by the magnet and placed in electrically conductive contact with the resistor network. Correct determination of the filling level is possible only in this way.

It is also preferred if the spacer element has two planar outer faces lying opposite one another, wherein arranged on each of the outer faces is at least one projection that protrudes from the outer face. This projection is advantageous in order to penetrate the penetrations provided in the resistor network and/or the contact element and thereby to bring about a defined material section of the spacer element onto the side of the resistor network and/or the contact element facing away from the spacer element. Only after this can hot-swaging of the part of the spacer element protruding through the penetration take place.

Moreover, it is advantageous if the spacer element is generated from a thermally deformable plastic, which is dimensionally stable at room temperature. For example, a thermoplastic is advantageous. This permits the spacer element to be formed easily and with only small geometric limitations and defined deformation of the sections of the spacer element protruding through the penetrations to be generated. In this way, the spacer element can easily be connected to the resistor network and/or the contact element. The plastic is preferably dimensionally stable above the level of the usual room temperature of approximately 20 degrees Celsius even up to a temperature limit which is above the usually occurring thermal loading during operation.

Furthermore, it is advantageous if the contact element and/or the resistor element has penetrations corresponding to the projections of the spacer element. This is advantageous to achieve precise positioning of the spacer element with respect to the resistor network and/or with respect to the contact element. This simplifies the assembly process.

It is also expedient if the spacer element is embodied in one piece with the resistor element, and the contact element is captively connected to the spacer element by hot-swaging. This is advantageous in order to reduce the complexity of the component and therefore simplify the assembly process. In such an embodiment, the spacer element can also advantageously be part of more wide-reaching, at least partial electrical insulation of the resistor network.

Advantageous refinements of the present invention are described in the subclaims and in the following description of the figures.

BRIEF DESCRIPTION OF THE DRAWINGS

The invention will be discussed in detail below on the basis of exemplary embodiments and with reference to the drawings. In the drawings.

PREFERRED EMBODIMENT OF THE INVENTION

Figure 1:
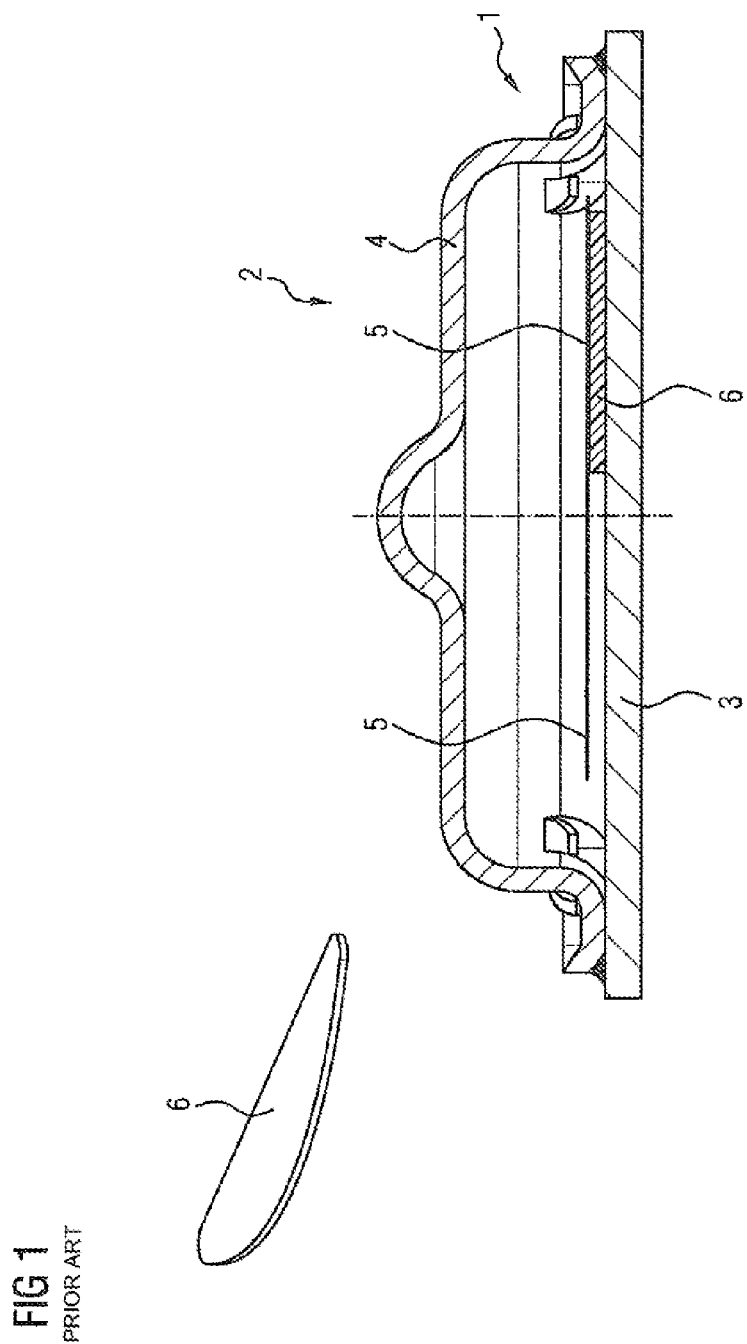
FIG. 1 is a section through a sensor of a filling level indicator such as is known in the prior art, wherein in the housing of the sensor the contact element is spaced apart from the resistor network by an adhesive tape.

FIG. 1 shows a sectional view through the housing 1 of a sensor 2 in the right-hand region. The sensor 2 has a resistor network 3 serving as a floor of the housing 1. A cover 4 is fitted onto this resistor network 3. A contact element 5, which is spaced apart from the resistor element 3 by a spacer element 6 is arranged in the cavity formed between them.

The spacer element 6 in FIG. 1 is formed by an adhesive tape, which adheres on both sides, adhered both to the contact element 5 and to the resistor network 3. The distance of the contact element 5 from the resistor network 3 is defined by the thickness of the adhesive tape 6.

A view of the adhesive tape is illustrated in the left-hand part of FIG. 1.

The adhesive tape 6 is sensitive to the corrosive properties of the fuel surrounds the housing 1 of the sensor 2 during operation. Therefore, the housing 1 must be sealed to prevent penetration of the fuel. For this purpose, a high degree of production expenditure has to be implemented. In addition, the housing 1 is often filled with helium to prevent the penetration of fuel. Consequently, this working step has to be provided within the scope of the production and additionally a leakage test for the sake of protection has to take place.

The exemplary embodiment in FIG. 1 corresponds to the prior art.

Figure 2:
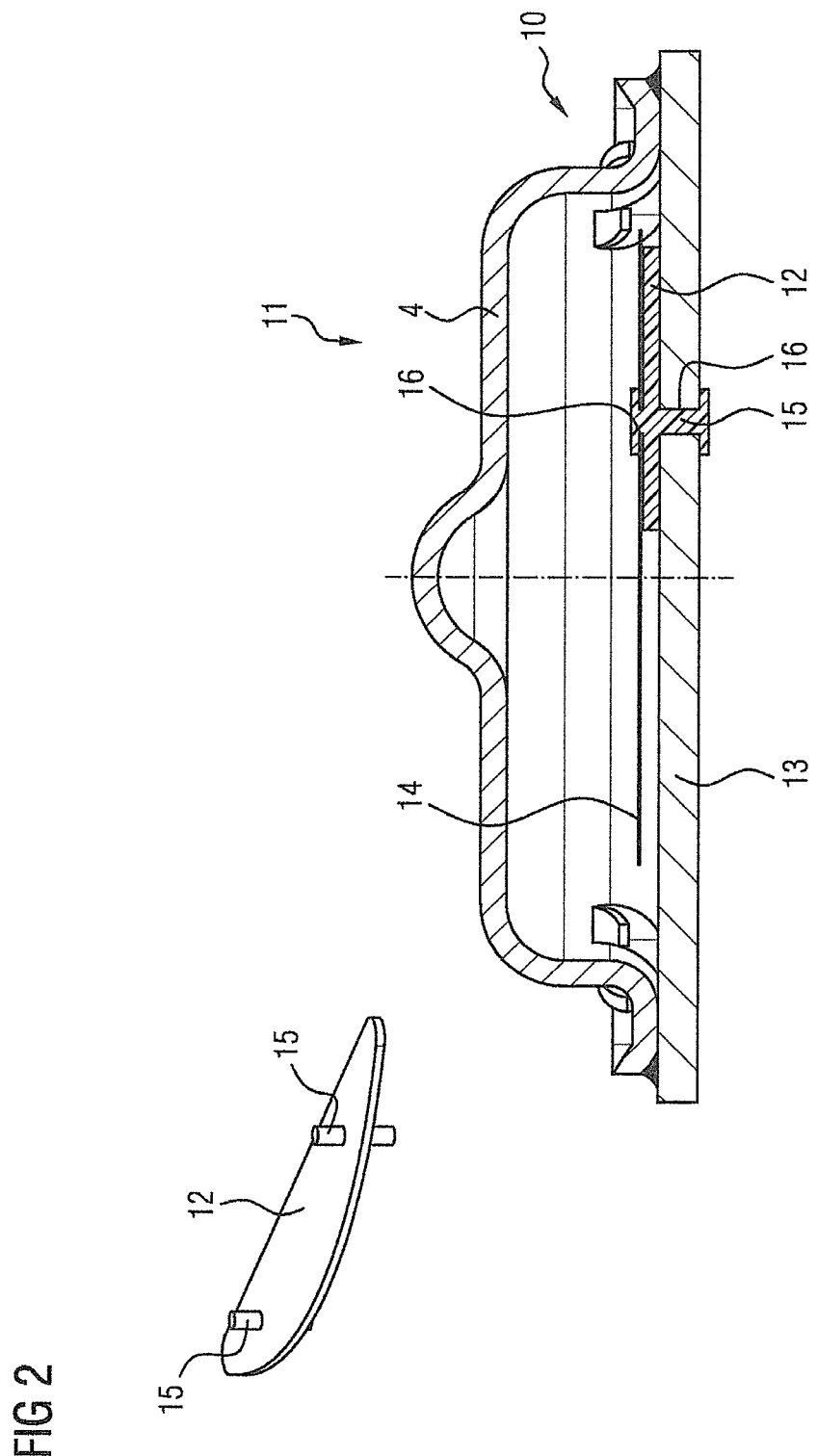
FIG. 2 is a section through a sensor of a filling level indicator, wherein in the housing of the sensor the contact element of the resistor network is formed by a spacer element made of plastic, which is hot-swaged to the contact element and to the resistor network.

FIG. 2 shows a section through a housing 10 of a sensor 11 whose functional principle corresponds to the sensor 1 already shown in FIG. 1.

In contrast to FIG. 1, in FIG. 2 the spacer element 12 is formed by a plastic element which is connected to the resistor network 13 and the contact element 14 by hot-swaging.

The selected plastic for the spacer element 12 is resistant to the corrosive effects of fuel, for which reason the seal of the housing 10 in FIG. 2 does not have to satisfy such stringent requirements as in the exemplary embodiment in FIG. 1.

The spacer element 12 is illustrated in a spatial view in the left-hand part of FIG. 2. The spacer element 12 has essentially the same dimensions as the spacer element 6 in FIG. 1. However, the spacer element 12 is fabricated from a different material.

Furthermore, the spacer element 12 has projections 15 that protrude upward and downward and serve for carrying out positioning with respect to the contact element 14 and the resistor network 13. The resistor network 13 and the contact element 14 have penetrations 16 through which the projections 15 are guided during assembly. The spacer element 12 is oriented with respect to the resistor network 13 and the contact element 14 by the positioning of the projections 15 and of the penetrations 16.

The projections 15 of the spacer element 12, which protrude through the contact element 14 and the resistor network 13, are heated during assembly and loaded with a force component in order to bring about widening of the projections 15 and thereby form an inseparable connection between the spacer element 12 and the contact element 14 and the resistor network 13.

The exemplary embodiment in FIG. 2 is exemplary and has, in particular, no restrictive character. It serves to clarify the inventive concept. In particular, the geometric dimensions of the spacer element 12 and the arrangement and the number of the penetrations 16 and projections 15 are exemplary.

A sensor such as is shown in FIGS. 1 and 2 can preferably be used in a filling level indicator which transmits, via a suitable mechanism, the filling level in a tank to a magnet which is passed by the sensor, wherein an electrical signal, which permits a direct conclusion about the filling level in the tank to be drawn, is generated by the magnet as a function of its position relative to the resistor network.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A filling level indicator configured to determine a filling level in a tank, comprising:
 a resistor network;
 a contact element is arranged spaced apart from the resistor network;
 a magnetic element movable relative to the resistor network and the contact element, wherein an electrically conductive connection can be established between the contact element and the resistor network by deflecting the contact element; and
 a spacer element made of plastic is arranged between the resistor network and the contact element to maintain a defined space between the resistor network and the contact element and is hot-swaged to at least one of the resistor network and the contact element.

2. The filling level indicator as claimed in claim 1, wherein at least one of the contact element and the resistor network has at least one penetration through which a projection of the spacer element protrudes.

3. The filling level indicator as claimed in claim 2, wherein a partial section of the spacer element that covers a respective penetration is arranged on one of the contact element and the resistor network on a side respectively facing away from the spacer element.

4. The filling level indicator as claimed in claim 1, wherein electrical insulation is provided by the spacer element between the contact element and the resistor network.

5. The filling level indicator as claimed in claim 1, wherein the spacer element has two planar outer faces lying opposite one another, wherein arranged on each outer faces is at least one projection that protrudes from a respective outer face.

6. The filling level indicator as claimed in claim 1, wherein the spacer element is a thermally deformable plastic that is dimensionally stable at room temperature.

7. The filling level indicator as claimed in claim 1, wherein at least one of the contact element and the resistor network has penetrations that correspond to projections of the spacer element.

8. The filling level indicator as claimed in claim 1, wherein the spacer element is embodied in one piece with the resistor network, and the contact element is captively connected to the spacer element by hot-swaging.

9. The filling level indicator as claimed in claim 1, wherein the spacer element has completely planar surfaces directly facing the resistor network and the contact element.

* * * * *